Patented May 29, 1923.

1,456,850

UNITED STATES PATENT OFFICE.

WILLIAM HAZEN AND WILLIAM H. ROSS, OF WASHINGTON, DISTRICT OF COLUMBIA.

PROCESS FOR PREPARING A CONCENTRATED FERTILIZER.

No Drawing.  Application filed December 20, 1922. Serial No. 608,073.

(FILED UNDER THE ACT OF MARCH 3, 1883, 22 STAT. L., 625.)

*To all whom it may concern:*

Be it known that we, WILLIAM HAZEN and WILLIAM H. ROSS, citizens of the United States of America, and employees of the Department of Agriculture of the said United States, residing at Washington, District of Columbia (whose post-office address is care of U. S. Department of Agriculture, Washington, D. C.), have invented a new and useful Process for Preparing a Concentrated Fertilizer.

This application is made under the act of March 3, 1883, chapter 142 (22 Stat., 625), and the invention herein described and claimed may be used by the Government of the United States or any of its officers or employees in the prosecution of work for the Government or persons in the United States without payment to us of any royalty thereon.

This invention relates to a process for preparing a concentrated product containing all three of the essential constituents of fertilizers.

The principal objects of this invention are, first, to produce a fertilizer of such concentration that handling and transportation charges are reduced to a minimum; and second to provide a means of utilizing new sources of fertilizer materials.

The Haber and other processes for fixing nitrogen and the volatilization method of treating phosphate rock all yield products of different composition and higher concentration than any now used in the preparation of fertilizers. When fixed in the form of ammonia, nitrogen is obtained in its most concentrated form and as this is a gas of strong alkaline reaction it is entirely unsuited for direct use as a fertilizer.

The product recovered in the volatilization process as now being developed for the more efficient utilization of our phosphate deposits is also unsuited for use in fertilizers in that it consists of a concentrated solution of phosphoric acid. By using ammonia for neutralizing this acid both products are converted into a fertilizer material which contains two of the three essential constituents of fertilizers and of such concentration that the content of both amounts to a total of 74 per cent.

The properties of this material make it admirably suited for use in the present grades of mixed fertilizers but its high concentration operates somewhat as a disadvantage when used in this way in that filler has to be added to give a mixture of desired composition. This disadvantage disappears however when ammonium phosphate is used in the preparation of high grade fertilizers and it is for use in such goods that materials of this kind are particularly recommended.

The purpose of this invention is to utilize potassium chloride as well as ammonia and phosphoric acid for the preparation of a high grade material containing all three of the essential constituents of fertilizers and of the same proportion as they occur in many fertilizer mixtures. As a product is thus obtained directly of the desired composition no addition of filler is necessary and its concentration is such that the cost of handling and transportation is reduced to a minimum.

When potassium chloride is treated with an equivalent solution of phosphoric acid and concentrated, only a small proportion of the chlorine is replaced by the phosphoric acid. The remainder of the chlorine may be eliminated by raising the temperature to a red heat but many mechanical difficulties attend the successful operation of the process and the residue that is obtained solidifies on cooling to a hard glassy-like mass which is very difficult to handle.

We have found that when solid potassium chloride is treated with a solution of phosphoric acid preferably of 70 to 90 per cent concentration, and in the proportion of 1 gram molecule of the salt to two of the acid, complete elimination of the chlorine as hydrochloric acid may be effected, at a temperature as low 200° C. The rate at which the hydrochloric acid is given off may be greatly increased by thoroughly aerating the solution or by forcing the solution as a fine spray into a stream of air. Aeration of the solution may be brought about by any one of several methods known in the art. A method that has been found very effective for the purpose consists in blowing air heated to about 200° C. through the porous bottom of the vessel containing the solution. Loss of material when the solution is sprayed into a current of air may be avoided by use of a Cottrell precipitator.

The hydrochloric acid given off in the process may be recovered by any one of the methods well known in the art, and serves as a valuable by-product.

The residue remaining after the escape of the hydrochloric acid consists of a solution of potassium phosphate with the equivalent amount of phosphoric acid. As a second step in the process the solution is now diluted if necessary to a specific gravity of about 1.50 to 1.65 and the excess of acid neutralized by the addition of gaseous ammonia. By this treatment the greater part of the material in solution is precipitated as a mixture of the phosphates of potassium and ammonium and may be separated from the mother liquor by centrifuging. This mother liquor may be added to a new batch of phosphate solution after the elimination of the hydrochloric acid, and on treating with ammonia as already described, continuous recovery of the product in a solid state is secured.

If the solution containing the excess of acid is of such a concentration as to give a specific gravity of 1.65 or above, the addition of sufficient ammonia to neutralize the acid will yield a solid product directly without centrifuging.

A solution of ammonia may be used in this process in place of gaseous ammonia but when the former is employed the phosphate solution to be neutralized should be of a correspondingly higher concentration. Thus when using, for example, a saturated solution of ammonia, the phosphate solution should be adjusted to a specific gravity of 1.85 to 1.95 instead of 1.50 to 1.65 as recommended for gaseous ammonia.

The product obtained when the raw materials are taken in the proportions hereinbefore described consists of a molecular equivalent mixture of mono-ammonium and mono-potassium phosphates in which the nitrogen, (N), phosphoric acid ($P_2O_5$) and potash ($K_2O$) bear about the same relation to each other as in a 2—10—4 fertilizer. By varying the proportions of the raw materials, concentrated products corresponding to a wide range of other fertilizer mixtures may be prepared in the same way. The foregoing description of our process should therefore be construed as illustrative and not by way of limitation and that the details of procedure, proportions of ingredients, temperature conditions and the like may be varied materially, all without departure from the spirit of our invention or the scope of the subjoined claims:

What we claim is:—

1. A process for the preparation of a concentrated material containing the three essential constituents of fertilizers which consists in treating potassium chloride with an excess of concentrated phosphoric acid, heating the solution to drive off hydrochloric acid, diluting with water, neutralizing the excess of acid with ammonia, and separating the precipitated salts from the mother liquor.

2. A process for the preparation of a concentrated material containing the three essential constituents of fertilizers which consists in treating potassium chloride with two molecular equivalents of concentrated phosphoric acid, heating the solution to drive off hydrochloric acid, diluting with water, neutralizing the excess of acid with ammonia, and separating the precipitated salts from the mother liquor.

3. A process for the preparation of a concentrated material containing the three essential constituents of fertilizers which consists in treating potassium chloride with an excess of phosphoric acid of 70 to 90 per cent concentration, heating the solution to drive off hydrochloric acid, diluting with water, neutralizing the excess of acid with ammonia, and separating the precipitated salts from the mother liquor.

4. A process for the preparation of a concentrated material containing the three essential constituents of fertilizers which consists in treating potassium chloride with an excess of concentrated phosphoric acid, heating the solution at a temperature of about 200° C. to drive off hydrochloric acid, diluting with water, neutralizing the excess of acid with ammonia, and separating the precipitated salts from the mother liquor.

5. A process for the preparation of a concentrated material containing the three essential constituents of fertilizers which consists in treating potassium chloride with an excess of concentrated phosphoric acid, driving off hydrochloric acid by aerating with air at a temperature of 200° C. or above, diluting with water, neutralizing the excess of acid with ammonia, and separating the precipitated salts from the mother liquor.

6. A process for the preparation of a concentrated material containing the three essential constituents of fertilizers which consists in treating potassium chloride with an excess of concentrated phosphoric acid, heating the solution to a temperature of about 200° C., driving off hydrochloric acid by spraying the solution in a current of air, diluting with water, neutralizing with ammonia, and separating the precipitated salts from the mother liquor.

7. A process for the preparation of a concentrated material containing the three essential constituents of fertilizers which consists in treating potassium chloride with an excess of concentrated phosphoric acid, heating the solution to drive off hydrochloric acid, diluting to a specific gravity of about 1.60, neutralizing the excess of acid with gaseous ammonia, and separating the precipitated salts from the mother liquor.

8. A process for the preparation of a concentrated material containing the three essential constituents of fertilizers which consists in treating potassium chloride with an excess of concentrated phosphoric acid, heating the solution to drive off hydrochloric acid, diluting to a specific gravity of about 1.90, neutralizing the excess of acid with a concentrated solution of ammonia, and separating the precipitated salts from the mother liquor.

9. A process for the preparation of a concentrated material containing the three essential constituents of fertilizers which consists in treating potassium chloride with an excess of concentrated phosphoric acid, heating the solution to drive off hydrochloric acid, neutralizing the excess of acid with a solution of ammonia, and separating the precipitated salts from the mother liquor.

10. A process for the preparation of a concentrated material containing the three essential constituents of fertilizers which consists in treating potassium chloride with an excess of phosphoric acid, heating the solution to drive off hydrochloric acid, adding an ammonia solution, and separating the precipitated salts from the mother liquor.

11. A process for the preparation of a concentrated material containing the three essential constituents of fertilizers which consists in treating potassium chloride with an excess of concentrated phosphoric acid, heating the solution to drive off hydrochloric acid, diluting with water, adding gaseous ammonia, and separating the precipitated salts from the mother liquor.

12. A process for the preparation of a concentrated material containing the three essential constituents of fertilizers which consists in treating potassium chloride with an excess of concentrated phosphoric acid, heating the solution to drive off hydrochloric acid, adjusting to a specific gravity of 1.65, and neutralizing the excess of acid with gaseous ammonia.

13. A process for the preparation of a concentrated material containing the three essential constituents of fertilizers which consists in treating potassium chloride with an excess of concentrated phosphoric acid, heating the solution to drive off hydrochloric acid adjusting to a specific gravity of 1.65 to 1.95, and solidifying the product by the addition of ammonia.

WILLIAM HAZEN.
WILLIAM H. ROSS.